Jan. 26, 1960    J. S. ROBERTS ET AL    2,922,492
LUBRICATOR
Filed June 20, 1957    2 Sheets-Sheet 1
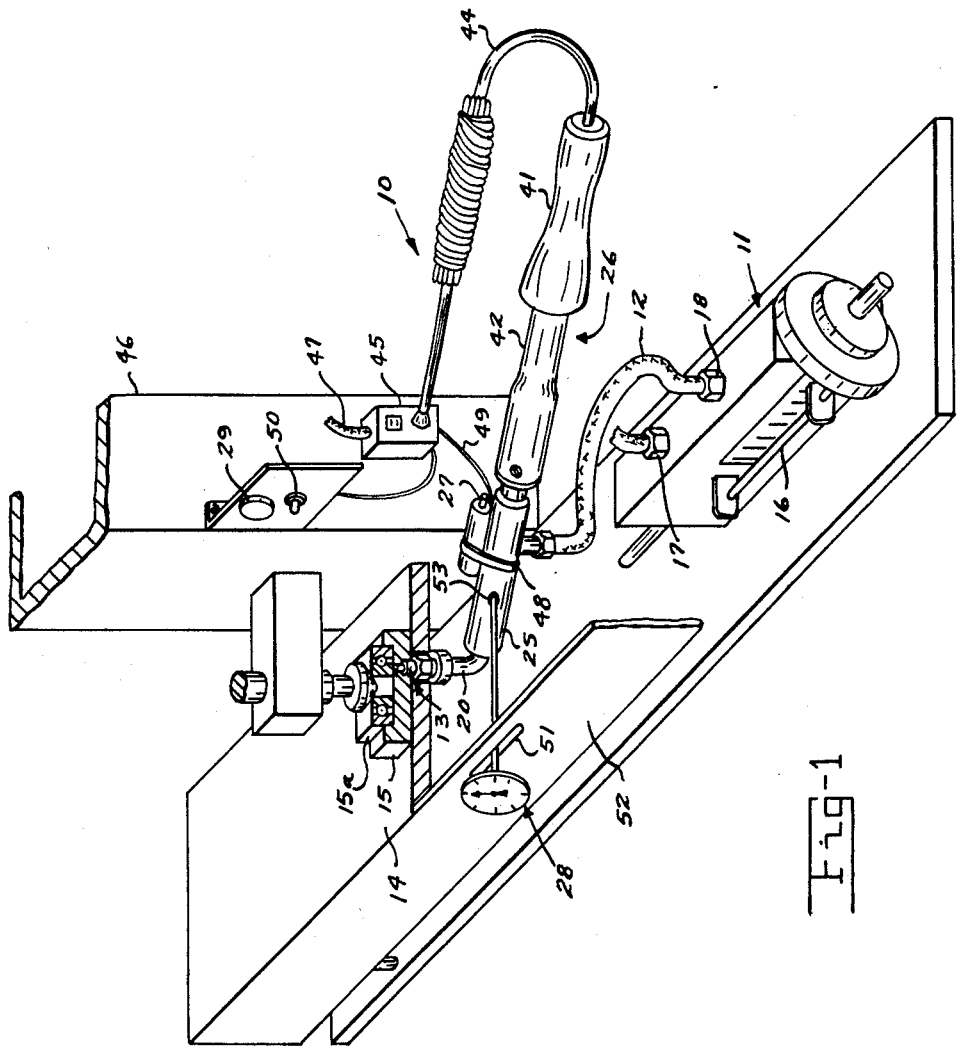
INVENTORS
JOHN S. ROBERTS
CHARLES J. OTT
TED GITTINGER
BY
ATTORNEYS

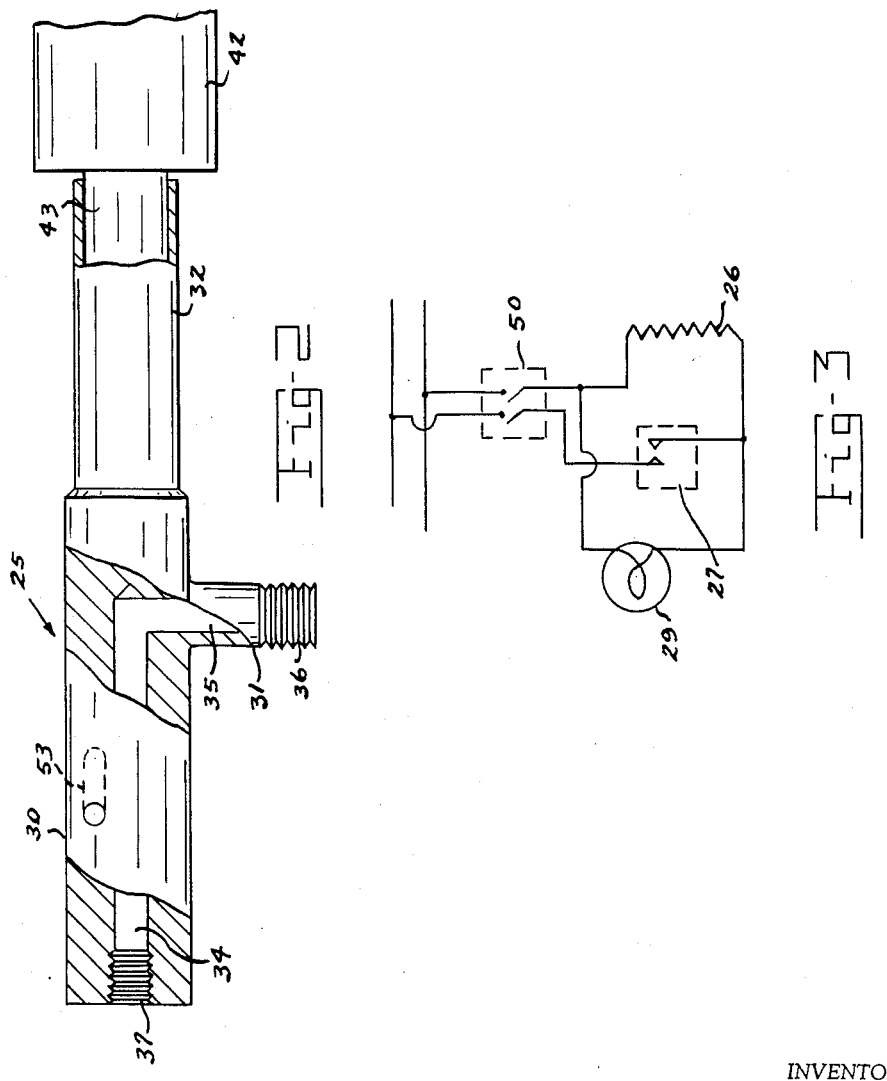

2,922,492
LUBRICATOR

John S. Roberts, Charles J. Ott, and Ted Gittinger, San Antonio, Tex.

Application June 20, 1957, Serial No. 667,057

3 Claims. (Cl. 184—1)

(Granted under Title 35, U.S. Code (1952), sec. 266)

The invention described herein may be manufactured and used by or for the United States Government for governmental purposes without payment to us of any royalty thereon.

The present invention relates to lubricators.

The present invention has more particular relation to a heater unit which is adaptable for installation in a lubricant supply conduit or dispenser which leads into some point of lubrication, and wherein the heater unit is operative to provide for the uniform and automatic heating of lubricant to a predetermined temperature level without interrupting the flow of the lubricant as it is being delivered through the conduit. For example, in greaser assemblies, such as, the bearing greaser assembly set forth in our copending application, Serial Number 628,206, filed December 13, 1956, Patent Number 2,886,132 a measured amount of grease is delivered through a supply conduit into a nozzle portion for regreasing bearings; however, due to the highly viscous nature of the grease, particularly at lower temperatures, it is often difficult to deliver the grease into the bearing at the desired consistency. Moreover, unless the greaser assembly is being constantly used it becomes expensive and time consuming to heat an entire grease supply, or any substantial amount, every time it is necessary to grease or regrease a bearing member.

Another problem involved in heating the grease is to accurately control its temperature and to maintain a uniform temperature of each quantity of grease to be supplied. In this respect, it is also more expedient to have some indication of whether the grease, just prior to delivery into the nozzle portion, is at the desired temperature level since of course the temperature level will govern the consistency of the grease.

It is accordingly an object of the present invention to provide for a lubrication apparatus to supply predetermined quantities of lubricants at a uniform, controlled temperature level to a member to be lubricated.

It is another object of the present invention to provide for means to automatically and successively heat predetermined quantities of grease to a predetermined temperature level as each quantity is being delivered through a supply line for lubrication purposes.

It is an additional object of the present invention to provide for a heater unit conformable for installation into various types of lubricators which can be easily installed to provide for the delivery of grease at a uniform temperature level and consistency without interruption of the flow of grease through the supply line.

It is a further object to provide a heater unit for installation into a lubricator including means to automatically control the temperature of a lubricant for delivery within a predetermined temperature range and further including means to provide for automatically and externally indicating the range of operation of the heater unit.

Other features and advantages of the present invention will become more apparent from the following description taken with the accompanying drawings, in which:

Fig. 1 is a perspective view showing parts of a greaser assembly together with a heater unit in accordance with the present invention;

Fig. 2 is a side elevational view in partial section of the grease reservoir forming a part of the heater unit; and Fig. 3 is a wiring diagram of the heater and control system for the heater.

With more particular reference to the drawing, there is shown in Fig. 1, for purposes of illustration, portions of a greaser assembly, the greaser assembly being more particularly described in our copending application, Serial Number 628,206, together with a heater unit 10. The portions of the greaser assembly which are shown include a meter valve assembly 11 for the delivery of a predetermined amount of grease through a flexible hose assembly 12 into a grease nozzle portion 13 which is supported in bearing mounting table 14 for upward extension into a grease fitting 15. A bearing member 15a or other member to be greased is then positioned on the grease fitting to receive the grease from the nozzle 13.

The valve assembly 11, which is also more particularly described in our copending application, includes a gage assembly 16 for presetting the valve assembly to conduct a measured amount of grease from a grease supply basin, not shown, into the intake port 17 through a chamber and into an exhaust port 18 and into the hose assembly 12. The flexible hose assembly 12 in turn forms a supply conduit to supply the grease under pressure through a check valve elbow 20 and the grease nozzle portion 13 into the bearing member.

In normal operation, the bearing member which is to be greased or regreased is supported on the grease fitting to receive the measured amount of grease delivered through the nozzle. Accordingly, the grease assembly is in use over spaced intervals to grease each bearing member placed on the grease fitting; of course there will also be extended periods of inactivity when the greaser assembly is not in use. As a consequence, and in accordance with the invention, it is proposed to heat only that quantity of grease required for delivery to the point of lubrication, and to heat the grease at a point as closely as possible to the grease nozzle portion in order to insure correct grease consistency just before the grease is forced into the bearing member. For this purpose, the heater unit 10 is made up of an adaptor member 25 which can be interpositioned between the hose assembly 12 and check valve elbow 20 or nozzle 13 to form a grease reservoir to heat the grease flowing into the nozzle. A heater 26 is then positioned in direct thermal contact with the adaptor member together with a thermostatic element, such as thermoswitch 27 to control the heating operation, and a thermometer 28 is inserted into the adaptor wall to relate the grease temperature with a light indicator 29 being electrically connected to the heater 26 to externally indicate the period of heating.

The adaptor member 25 is of generally T-shaped configuration and is composed of a material of high heat conductivity, such as copper. It consists principally of a main, cylindrical body 30 having a connection member 31 extending outwardly at right angles from one end of the body and a tubular socket 32 forming an extension of the body 30 adjacent the connection member. Both the cylindrical body 30 and connection member 31 are provided with bore portions 34 and 35, respectively, which are drilled axially through the body 30 and connection member 31 so as to intersect at a common point in the body portion; the bore portions 34 and 35 thus form a continuous, but angular, passage for the flow of grease through the adaptor member, with the passage being surrounded by the thick walls of the body 30 and connection member 31. To interconnect the hose assembly 12 and check valve elbow 20, the connection member is externally threaded as at 36 at its outer end and the body is internally threaded as at 37 at the entrance to the bore portion 34 for attachment to the respective ends of the hose assembly and check valve elbow.

The tubular socket extension 32 is thin walled in comparison to the body 30 and is proportioned to secure in close fitting relation therein the probe type heater 26, such as a commercial type soldering iron shown in Fig. 1, which includes an insulated handle 41, a heating element 42 and an elongate tip or probe 43 at the end of the heater element for insertion into the socket extension 32. Passing through the handle 41 is an electric cord 44 for connection into a receptacle 45, the receptacle being mounted on an upright wall portion 46 disposed on the base of the greaser assembly with an extension cord 47 leading into the receptacle from a suitable voltage source.

For operation and control of the heater 26 the thermoswitch 27 is held firmly against the outer surface of the adaptor member 25 by means of a metal strap 48 with a cable 49 leading from the thermoswitch 27 for connection into the receptacle 45. Also positioned on the upright panel 46 above the receptacle is a double pole, single throw switch 50 for manually switching the soldering iron to the on and off position. As shown in Fig. 3 the soldering iron operation is automatically controlled by electrically connecting the thermoswitch 27 between the DPST switch 50 and one lead wire of the soldering iron 26, and the light indicator 29 is connected across the soldering iron so as to be energized when the thermoswitch 27 is closed to permit the soldering iron to heat. In addition, the thermometer 28 is inserted through a slot 51 in panel 52 and into a recess 53 which is drilled into the upper wall portion of the body 30 at a 45° angle to the axis of the body as shown in Fig. 2. The thermometer 28, which is of the bimetal dial type can then be inserted into the recess 53 to relate the temperature of the wall adjacent the grease passage of the adaptor member 25.

The thermoswitch 27 is of a type, such as, the Fenwal P/N 17030-8, which can be preset so as to close the circuit into the soldering iron at a first temperature level and to break the circuit at a certain predetermined temperature above the first temperature level position, this temperature range being governed in accordance with the desired consistency of the grease.

To calibrate the thermoswitch for the desired temperature settings the thermometer 28 along with the light indicator 29 are utilized by first adjusting the thermoswitch to the desired grease temperature; the light indicator 29 will then light as the thermoswitch has properly closed to make contact between the switch 50 and the soldering iron. Since the temperature of the soldering iron will continue to rise approximately 20° after the thermoswitch has opened, the thermoswitch should be adjusted to shut off when the temperature of the grease has reached a point approximately 20° below the desired temperature. Thus the operation of the soldering iron and indicator light will be controlled by the thermoswitch and will be automatic so long as the DPST switch is on the "on" position.

By making the socket extension comparatively thin walled and the main body 30 of the adaptor member thick walled, heat will be conducted rapidly and uniformly throughout the body portion and connection member. The adaptor member, in turn, being of high heat conductivity will rapidly conduct heat to the grease and also to the thermoswitch so that the thermoswitch will be rapidly responsive to temperature variations in the adaptor member and the grease flowing therethrough.

As an illustration of relative sizes and proportions of the parts comprising the present invention which have been found satisfactory, with a hose assembly of ½ inch diameter, the grease passage is somewhat constricted to a diameter on the order of ¼ inch to insure maximum distribution of heat to the grease, and the body is of a diameter of approximately 1 inch. In total length the grease passage is 3 inches along the length of the body and about 1½ inches from the end of the connection member into the body. As mentioned, it is not necessary that the connection member be disposed perpendicular to the body but is preferably at some angle to the body in order to cause the grease to change its path of flow through the adaptor member. The length of the main body 30 of the adaptor member 35 is approximately 4 inches and the length of the socket extension about 2½ inches, and the socket extension is given an internal diameter equal to the diameter of the tip 43 of the soldering iron in order to inclose the tip and support the entire soldering iron. Of course, as previously mentioned other types of heaters may be used in place of the soldering iron for heating the adaptor member through the desired temperature range.

It is to be understood that various modifications and changes may be made in the design and arrangements of the parts without departing from the scope of the invention as defined by the appended claims.

What is claimed:

1. A grease heater assembly installed in a grease supply conduit wherein a quantity of grease is fed through said conduit for delivery to a point of lubrication, said grease heater comprising a thick-walled adaptor member of generally elbow-shaped configuration including a grease passage extending throughout the length thereof and a tubular extension at one end thereof, a heater device including a probe member, said probe member being disposed in close fitting relation in said tubular extension to heat said adaptor to a predetermined temperature level and means responsive to the temperature variations of said adaptor member to control the operation of said heating element within a predetermined temperature range, said adaptor member being of a material to provide for the rapid and uniform transfer of heat for heating the grease flowing therethrough.

2. A heater unit installed in a grease supply conduit wherein a quantity of grease is fed through said conduit for delivery to a point of lubrication, said heater comprising a thick-walled adaptor member having a body, a tubular socket forming an extension of said body and a connection member disposed at an angle to said body, said adaptor member further including a grease passage extending continuously through said connection member and said body for the flow of grease therethrough, an electric heater device including a voltage source and a heating probe member inserted into said tubular socket to heat said adaptor member to a predetermined temperature level, and means responsive to temperature variations in said adaptor member to control the operation of said heater within a predetermined temperature range, said adaptor member being of a material to provide for the rapid and uniform transfer of heat for heating the grease flowing therethrough.

3. A heater assembly installed in a lubricator wherein said lubricator is provided with a nozzle member, a supply conduit and means for delivering a predetermined quantity of lubricant through said conduit and nozzle, said heater assembly comprising, an adaptor member having a thick-walled body, a thin-walled tubular socket forming an extension of said body at one end thereof, and a thick-walled connection member disposed at an angle to said body, said adaptor member and said connection member including axial bore portions terminating and intersecting within said body so as to define a continuous grease passage, said connection member providing communication between said nozzle and said conduit for the flow of grease through said grease passage, said passage being of a diameter smaller than said conduit diameter, an electric heater including a probe member inserted into said tubular socket in close fitting relation therewith, and means responsive to temperature variations in said adaptor member to control the operation of said heater within a predetermined temperature range, said adaptor member being of a material to provide for the rapid and uniform transfer of heat to the grease flowing therethrough.

References Cited in the file of this patent

UNITED STATES PATENTS

| | | |
|---|---|---|
| 1,355,867 | Thompson | Oct. 19, 1920 |
| 2,248,486 | Birk | July 8, 1941 |
| 2,388,523 | Buechel | Nov. 6, 1945 |
| 2,541,637 | Christopher et al. | Feb. 13, 1951 |
| 2,736,392 | Slivar | Feb. 28, 1956 |